US012614905B2

(12) United States Patent
Johansson

(10) Patent No.: US 12,614,905 B2
(45) Date of Patent: Apr. 28, 2026

(54) OVERLAP CIRCUIT FOR A POWER SYSTEM

(71) Applicant: Blixt Tech AB, Kista (SE)

(72) Inventor: Jan Johansson, Solna (SE)

(73) Assignee: Blixt Tech AB, Kista (SE)

( * ) Notice: Subject to any disclaimer, the term of this patent is extended or adjusted under 35 U.S.C. 154(b) by 148 days.

(21) Appl. No.: 17/918,165

(22) PCT Filed: Apr. 19, 2021

(86) PCT No.: PCT/EP2021/060053
§ 371 (c)(1),
(2) Date: Oct. 11, 2022

(87) PCT Pub. No.: WO2021/209641
PCT Pub. Date: Oct. 21, 2021

(65) Prior Publication Data
US 2023/0135775 A1      May 4, 2023

(30) Foreign Application Priority Data

| | | |
|---|---|---|
| Apr. 17, 2020 | (SE) | .................................... 2050438-7 |
| Apr. 17, 2020 | (SE) | .................................... 2050439-5 |
| Apr. 17, 2020 | (SE) | .................................... 2050440-3 |

(51) Int. Cl.
*H02J 1/10* (2026.01)
*H02J 1/108* (2026.01)
*H02J 7/50* (2026.01)

(52) U.S. Cl.
CPC .............. *H02J 1/106* (2020.01); *H02J 1/108* (2013.01); *H02J 1/109* (2020.01); *H02J 7/50* (2026.01); *H02J 7/585* (2026.01)

(58) Field of Classification Search
CPC .. H02J 1/10–109; H02J 7/0019; H02J 7/0025; H02J 7/1423; H02J 9/061; B60L 58/21–22; G06F 1/263
See application file for complete search history.

(56) References Cited

U.S. PATENT DOCUMENTS

| | | | | |
|---|---|---|---|---|
| 5,336,568 A | * | 8/1994 | Andrieu | ................ H02J 7/0024 429/61 |
| 5,621,254 A | * | 4/1997 | Takeda | .................... H02J 9/061 307/64 |

(Continued)

FOREIGN PATENT DOCUMENTS

| | | | |
|---|---|---|---|
| DE | 10 2018 217 382 A1 | 4/2020 | |
| WO | WO-2020209132 A1 | * 10/2020 | ............. B60R 16/03 |

OTHER PUBLICATIONS

English machine translation of WO202/209132A1 published Oct. 15, 2020 (Year: 2020).*

(Continued)

*Primary Examiner* — Rexford N Barnie
*Assistant Examiner* — David A Shiao
(74) *Attorney, Agent, or Firm* — Blank Rome LLP

(57) ABSTRACT

The invention relates to an overlap circuit configured to be coupled between power source(s) and load(s) for power transfer. The herein disclosed overlap circuit (100) is configured to transfer electrical power to two loads or two power sources at the same time during an overlap power transfer time period. Furthermore, the invention also relates to a system comprising such an overlap circuit.

7 Claims, 19 Drawing Sheets

(56)                   References Cited

U.S. PATENT DOCUMENTS

| | | | | |
|---|---|---|---|---|
| 2002/0135235 A1* | 9/2002 | Winick | ............... | H03K 17/302 |
| | | | | 307/87 |
| 2004/0198468 A1* | 10/2004 | Patel | .................... | H02J 7/0025 |
| | | | | 455/574 |
| 2006/0125443 A1* | 6/2006 | Bolduc | ................ | H02J 7/1423 |
| | | | | 320/104 |
| 2007/0247114 A1* | 10/2007 | Makwana | ............. | G06F 1/1632 |
| | | | | 320/116 |
| 2008/0231117 A1* | 9/2008 | Bucur | ................... | H02J 7/0018 |
| | | | | 320/137 |
| 2010/0066431 A1* | 3/2010 | Carter | .................... | H02J 9/061 |
| | | | | 327/408 |
| 2015/0115719 A1* | 4/2015 | Siciliano | ................... | H02J 3/00 |
| | | | | 307/64 |
| 2017/0120772 A1 | 5/2017 | Alser et al. | | |
| 2017/0237128 A1* | 8/2017 | Kubo | .................... | H02J 7/0029 |
| | | | | 429/7 |
| 2019/0103750 A1 | 4/2019 | Kristensen | | |
| 2019/0173274 A1* | 6/2019 | Fukae | .................. | H01M 10/44 |
| 2020/0076208 A1* | 3/2020 | Williams | ................. | H02J 7/34 |
| 2021/0273440 A1* | 9/2021 | Kang | ...................... | H02H 3/08 |

OTHER PUBLICATIONS

"MOSFET", Apr. 23, 2025, Wikipedia. (Year: 2025).*
"Power MOSFET", Apr. 23, 2025, Wikipedia. (Year: 2025).*

* cited by examiner

T11

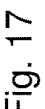
Fig. 17
T2
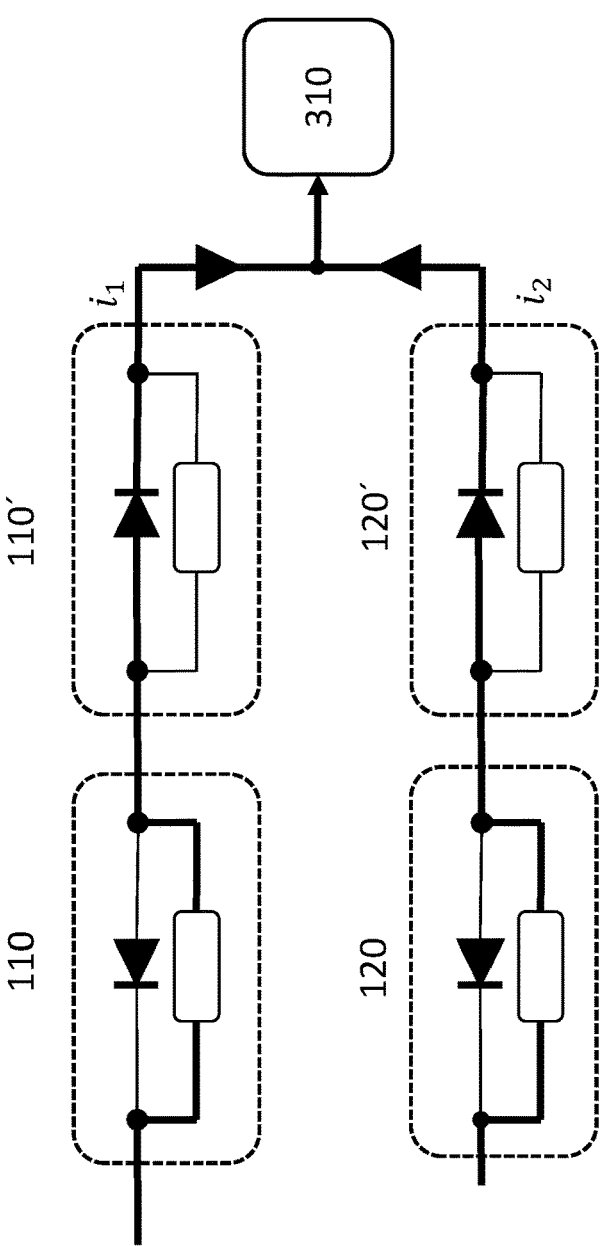

T31

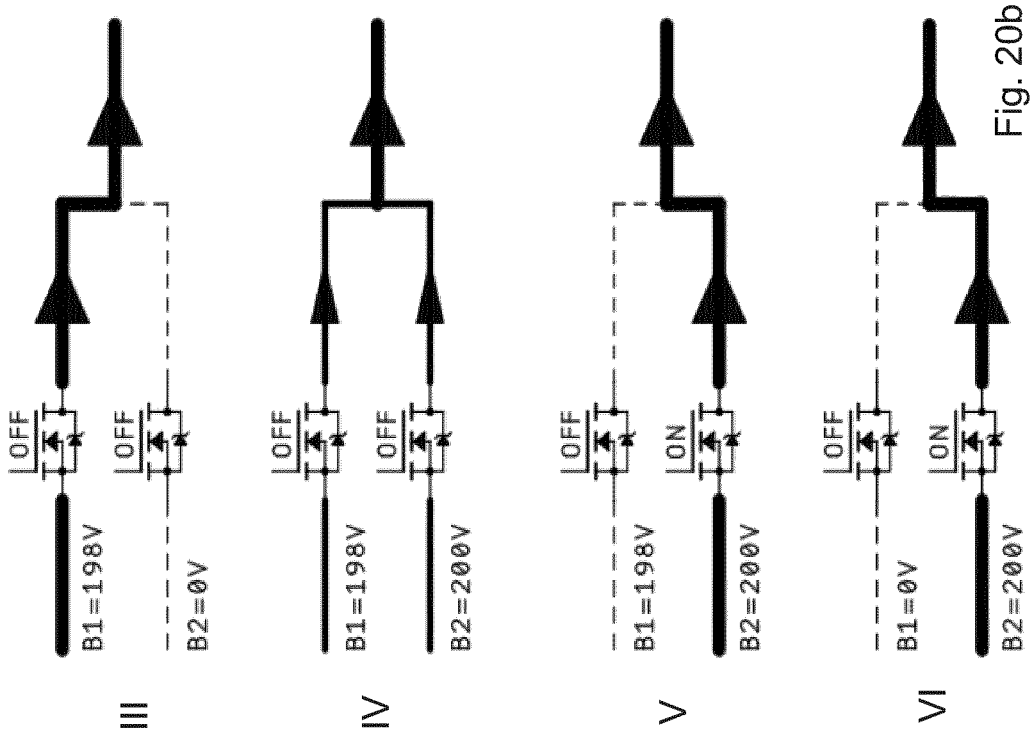
Fig. 20b
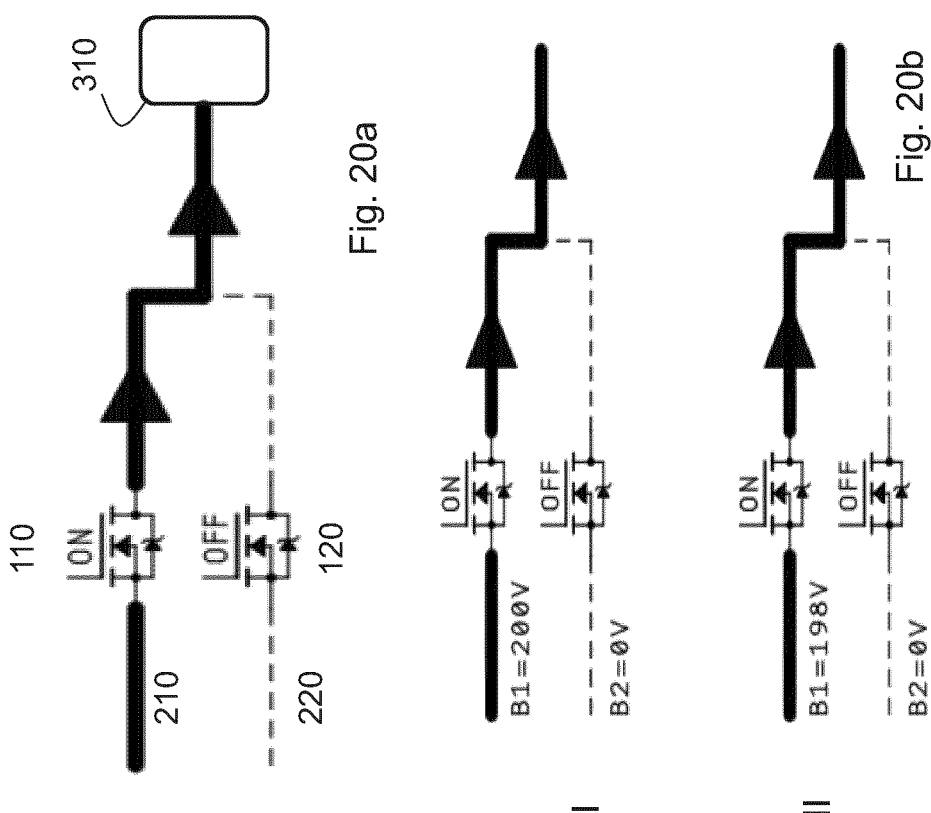
Fig. 20a
Fig. 20b

OVERLAP CIRCUIT FOR A POWER SYSTEM

TECHNICAL FIELD

The invention relates to an overlap circuit for a power system and to a power system comprising such an overlap circuit.

BACKGROUND

An electrical power system may be an electrical network comprising electrical components and devices interconnected through an electrical infrastructure. The components and devices may be configured to supply, transfer and consume electrical power. The electrical power system may also comprise one or more power sub-systems interconnected through the electrical infrastructure.

When two separate power sources are connected to a common load or when a common power source is connected to two separate loads an intermediate device or circuit may be needed for the transfer of electrical power from the power source(s) to the load(s). The intermediate device or circuit may function as a switch for transferring the power and hence often comprises transistors/switches coupled in different configurations so as to operate according to the intended function. However, such transfer of electrical power results in different types of unwanted losses, such as conduction loss, switching loss, deadtime loss, gate loss and IC loss.

SUMMARY

An objective of embodiments of the invention is to provide a solution which mitigates or solves the drawbacks and problems of conventional solutions.

Another objective of embodiments of the invention is to provide a solution for reducing power losses compared to conventional solutions.

The above and further objectives are solved by the subject matter of the independent claims. Further advantageous embodiments of the invention can be found in the dependent claims.

According to a first aspect of the invention, the above mentioned and other objectives are achieved with an overlap circuit for a power system, the overlap circuit comprising:

a first controllable switch configured to be coupled between a first power source and a load;

a second controllable switch configured to be coupled between a second power source and the load; wherein i) during a first time period T1, the first controllable switch is configured to feed a first current $i_1$ from the first power source to the load when the second controllable switch is configured to block a second current $i_2$ from the second power source to the load;

ii) during a second time period T2 following the first time period T1, the first controllable switch is configured to feed a first current $i_1$ from the first power source to the load when the second controllable switch is configured to feed a second current $i_2$ from the second power source to the load; and iii) during a third time period T3 following the second time period T2, the first controllable switch is configured to block a first current $i_1$ from the first power source to the load when the second controllable switch is configured to feed a second current $i_2$ from the second power source to the load.

The time periods T1-T3 are in a sequential order. The second time period T2 may be denoted an overlap power transfer time period since both the first and second power sources feed current to the common load at the same time. The overlap circuit may hence also be denoted an electrical power transfer circuit.

An advantage of the overlap circuit according to the first aspect is that switching and deadtime losses are reduced or eliminated compared to conventional solutions since no deadtimes are used. Further, a continuous current can be provided to the load which means that components used for compensating for deadtimes as in conventional solutions, such as inductors and capacitors, are not needed.

In an embodiment of an overlap circuit according to the first aspect, the duration of the second time period T2 is dependent on a switching time of the first controllable switch and/or a switching time of the second controllable switch.

In an embodiment of an overlap circuit according to the first aspect, the duration of the second time period T2 is less than 10% of the duration of the first time period T1 and/or the duration of the third time period T3.

An advantage of these embodiments is that the switching losses can be held as low as possible.

In an embodiment of an overlap circuit according to the first aspect, iv) during a fourth time period T4 following the third time period T3, the first controllable switch is configured to feed a first current $i_1$ from the first power source to the load when the second controllable switch is configured to feed a second current $i_2$ from the second power source to the load.

In an embodiment of an overlap circuit according to the first aspect, the overlap circuit is configured to repeat steps i) to iv) any number of times.

An advantage with this embodiment is that the overlap time periods can be repeated over and over in any number of cycles.

In an embodiment of an overlap circuit according to the first aspect, the overlap circuit further comprises a control device/arrangement configured to provide first control signals to the first controllable switch and provide second control signals to the second controllable switch so that the first controllable switch and the second controllable switch both are conductive during the second time period T2 thereby simultaneously feeding currents to the load.

An advantage with this embodiment is that the overlap time periods can be controlled by control signalling having suitable clocking.

In an embodiment of an overlap circuit according to the first aspect, the first control signals and the second control signals are simultaneous or non-simultaneous clocked.

Hence, both simultaneous and non-simultaneous clocked control signalling can be used for achieving overlap power transfer.

In an embodiment of an overlap circuit according to the first aspect, the first control signals and the second control signals are non-simultaneous clocked with a time offset dependent on at least one of: a current provided to the load, a voltage difference between the first power source and the second power source, and a resistance value when a resistance of the first controllable switch equals a resistance of the second controllable switch.

By using non-simultaneous clocking of the control signals with a time offset therebetween the current delivered to the load can be further controlled and tuned. Further, in cases when using low resistance values for the controllable switch, the voltage in the system can be upheld.

In an embodiment of an overlap circuit according to the first aspect, the first controllable switch comprises at least one first diode coupled in parallel with at least one first variable resistor between the first power source and the load; and the second controllable switch comprises at least one second diode coupled in parallel with at least one second variable resistor between the second power source and the load.

In an embodiment of an overlap circuit according to the first aspect, during the first time period T1, the first variable resistor is configured to provide a first current $i_1$ to the load and subsequently the first diode is configured to provide a first current $i_1$ to the load;

during the second time period T2, the first diode is configured to provide a first current $i_1$ to the load and the second diode is configured to provide a second current $i_2$ to the load; and during the third time period T3, the second diode is configured to provide a second current $i_2$ to the load and subsequently the second variable resistor is configured to provide a second current $i_2$ to the load.

An advantage with this embodiment is that by performing the above sequence order current(s) can be blocked in suitable manner between the first and second power sources.

In an embodiment of an overlap circuit according to the first aspect, the overlap circuit is configured to switch from i) to ii) when an output voltage of the first power source is smaller than a first threshold voltage $V^{Th1}$; and/or switch from i) to ii) when an output voltage of the second power source is larger than a second threshold voltage $V_{Th2}$.

In an embodiment of an overlap circuit according to the first aspect, the first threshold voltage $V_{Th1}$ is dependent a nominal voltage $V_n$ of the load, and/or the second threshold voltage $V_{Th2}$ is dependent on at least one of the first threshold voltage $V_{Th1}$ and the nominal voltage $V_n$ of the load.

In an embodiment of an overlap circuit according to the first aspect, the first threshold voltage $V^{Th1}$, is larger than 90% of the nominal voltage $V_n$ of the load; and/or the second threshold voltage $V_{Th2}$ is higher or equal to a nominal voltage $V_n$ of the load; and/or the second threshold voltage $V_{Th2}$ is dependent on a difference voltage between the first threshold voltage $V_{Th1}$ and the nominal voltage $V_n$ of the load.

In an embodiment of an overlap circuit according to the first aspect, the first controllable switch comprises two first diodes coupled in series with each other in opposite directions between the first power source and the load, and the second controllable switch comprises two second diodes coupled in series with each other in opposite directions between the second power source and the load.

An advantage with this embodiment is that by using two diodes the current from the other power source can be blocked not matter if the voltage over the controllable switch raises or falls.

In an embodiment of an overlap circuit according to the first aspect, the first power source is configured to act as a first load, the second power source is configured to act as a second load and the load is configured to act as a common power source; and wherein the first controllable switch is configured to feed a first current $i_1$ from the common power source to the first load when the second controllable switch is configured to feed a second current $i_2$ from the common power source to the second load.

In this embodiment the direction of the current is reversed. For example, the load may be an electrical motor and the first power source and the second power source may be separate batteries or sets of batteries for delivering power to the electrical motor. In such configurations the electrical motor may operate in two modes, i.e. in a first mode as a load and in a second mode as a power source.

According to a second aspect of the invention, the above mentioned and other objectives are achieved with an overlap circuit for a power system, the overlap circuit comprising:

a first controllable switch configured to be coupled between a power source and a first load;

a second controllable switch configured to be coupled between the power source and a second load; wherein i) during a first time period T1, the first controllable switch is configured to feed a first current $i_1$ from the power source to the first load when the second controllable switch is configured to block a second current $i_2$ from the power source to the second load;

ii) during a second time period T2 following the first time period T1, the first controllable switch is configured to feed a first current $i_1$ from the power source to the first load when the second controllable switch is configured to feed a second current $i_2$ from the power source to the second load; and iii) during a third time period T3 following the second time period T2, the first controllable switch is configured to block a first current $i_1$ from the power source to the first load when the second controllable switch is configured to feed a second current $i_2$ from power source to the second load.

An advantage of the overlap circuit according to the second aspect is that switching and deadtime losses are reduced or eliminated compared to conventional solutions since no deadtimes are applied. Further, a continuous current can be provided to the load which means that components used for compensating for deadtimes as in conventional solutions, such as inductors and capacitors, are not needed.

In an embodiment of an overlap circuit according to the second aspect, iv) during a fourth time period T4 following the third time period T3, the first controllable switch is configured to feed a first current $i_1$ from the power source to the first load when the second controllable switch is configured to feed a second current $i_2$ from the power source to the second load.

In an embodiment of an overlap circuit according to the second aspect, the overlap circuit being configured to repeat steps i) to iv) any number of times.

An advantage with this embodiment is that the overlap time periods can be repeated over and over in any number of cycles.

In an embodiment of an overlap circuit according to the second aspect, the overlap circuit further comprises a control device/arrangement configured to provide first control signals to the first controllable switch and provide second control signals to the second controllable switch so that the first controllable switch and the second controllable switch both are conductive during the second time period T2 thereby simultaneously feeding currents to the first load and the second load, respectively.

An advantage with this embodiment is that the overlap time periods can be controlled by control signalling having suitable clocking.

In an embodiment of an overlap circuit according to the second aspect, the first control signals and the second control signals are simultaneous or non-simultaneous clocked.

Hence, both simultaneous and non-simultaneous clocked control signalling can be used for achieving overlap power transfer.

In an embodiment of an overlap circuit according to the second aspect, the first control signals and the second control signals are non-simultaneous clocked with a time offset dependent on at least one of: current provided to the first load and a current provided to the second load, a voltage difference between the first load and the second load, and a resistance value when a resistance of the first controllable switch equals a resistance of the second controllable switch.

By using non-simultaneous clocking of the control signals with a time offset therebetween the current delivered to the loads can be further controlled and tuned. Further, in cases when using low resistance values for the controllable switch, the voltage in the system can be upheld.

In an embodiment of an overlap circuit according to the second aspect, the first controllable switch comprises at least one first diode coupled in parallel with at least one first variable resistor between the power source and the first load;

the second controllable switch comprises at least one second diode coupled in parallel with at least one second variable resistor between the power source and the second load.

In an embodiment of an overlap circuit according to the second aspect, during the first time period T1, the first variable resistor is configured to provide a first current $i_1$ to the first load and subsequently the first diode is configured to provide a first current $i_1$ to the first load;

during the second time period T2, the first diode is configured to provide a first current $i_1$ to the first load and the second diode is configured to provide a second current $i_2$ to the second load; and during the third time period T3, the second diode is configured to provide a second current $i_2$ to the second load and subsequently the second variable resistor is configured to provide a second current $i_2$ to the second load.

An advantage with this embodiment is that by performing the above sequence order current(s) can be blocked in suitable manner between the first and second power sources.

In an embodiment of an overlap circuit according to the second aspect, the overlap circuit is configured to switch from i) to ii) when a voltage over the first load is higher than a first threshold voltage $V_{Th1}$; and/or switch from i) to ii) when a voltage over the second is smaller than a second threshold voltage $V_{Th2}$.

In an embodiment of an overlap circuit according to the second aspect, the first threshold voltage $V_{Th1}$ is dependent a nominal voltage $V_n$ of the first load, and/or the second threshold voltage $V_{Th2}$ is dependent on a nominal voltage $V_n$ of the second load.

In an embodiment of an overlap circuit according to the second aspect, the first threshold voltage $V_{Th1}$ is larger than 90% of the nominal voltage $V_n$ of the load.

the second threshold voltage $V_{Th2}$ is higher or equal to a nominal voltage $V_n$ of the load.

the second threshold voltage $V_{Th2}$ is dependent on a difference voltage between the first threshold voltage $V_{Th1}$ and the nominal voltage $V_n$ of the load.

In an embodiment of an overlap circuit according to the second aspect, the first controllable switch comprises two first diodes coupled in series with each other in opposite directions between the power source and the first load first, and the second controllable switch comprises two second diodes coupled in series with each other in opposite directions between the power source and the second load.

An advantage with this embodiment is that by using two diodes a current can be blocked in a non-intended direction no matter if the voltage over the controllable switch raises or falls.

In an embodiment of an overlap circuit according to the second aspect, the first load is configured to act as a first power source, the second load is configured to act as a second power source and the power source is configured to act as a common load; and wherein the first controllable switch is configured to feed a first current $i_1$ from the first power source to the common load when the second controllable switch is configured to feed a second current $i_2$ from the second power source to the common load.

In this embodiment the direction of the current is reversed.

Embodiments of the invention also relates to a power system comprising at least one power source, at least one load, and at least one overlap circuit according to embodiments of the invention configured to transfer current/power between the at least one power source and the at least one load.

Further applications and advantages of the embodiments of the invention will be apparent from the following detailed description.

BRIEF DESCRIPTION OF THE DRAWINGS

The appended drawings are intended to clarify and explain different embodiments of the invention, in which:

FIGS. 15-19 illustrate an overlap circuit according to embodiments of the invention;

FIGS. 20a and 20b show state diagram for a one switch implementation according to embodiments of the invention;

DETAILED DESCRIPTION

Figures 1, 2:
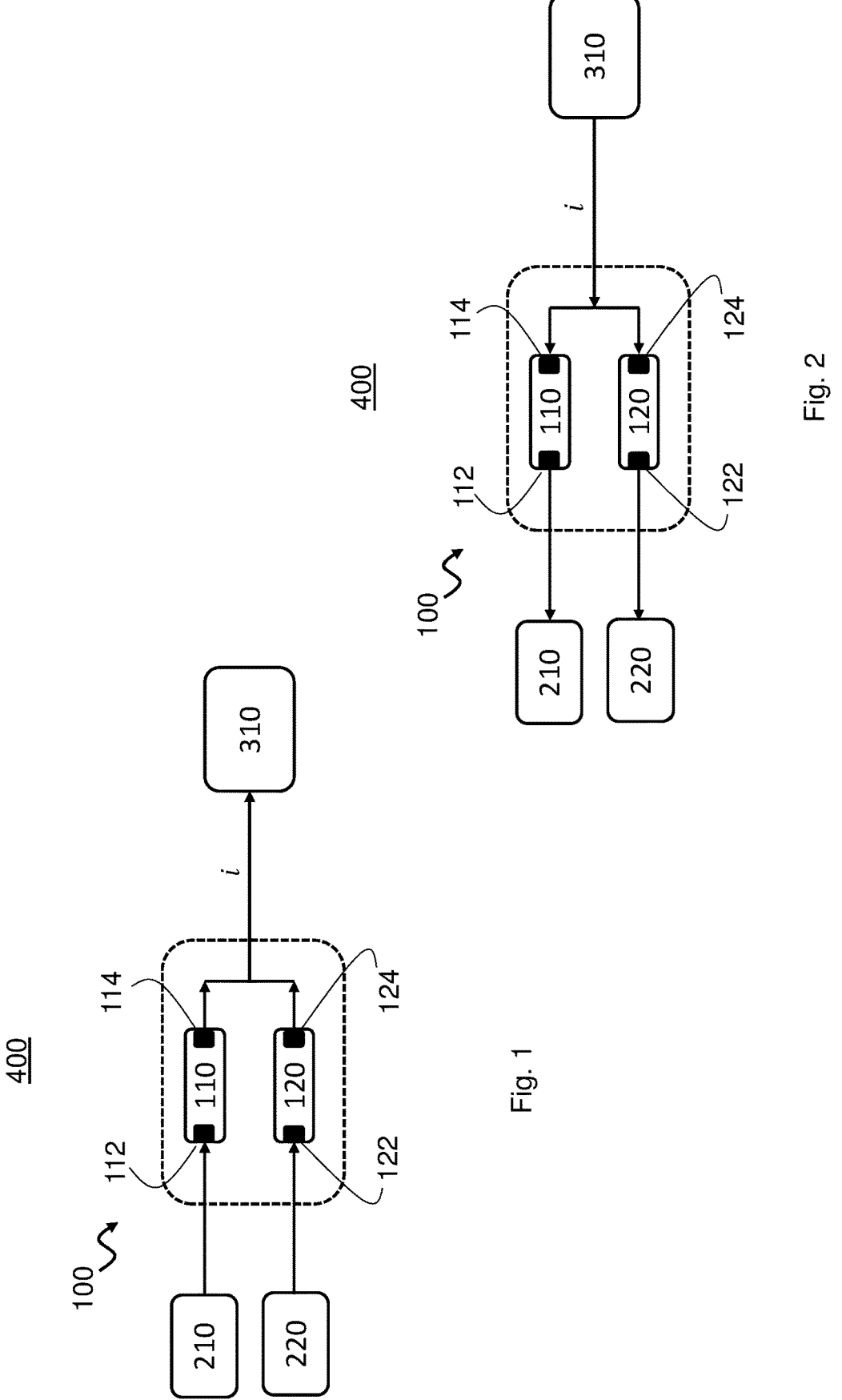
FIGS. 1 and 2 show overlap circuits according to aspects of the invention.
Figures 3, 4:
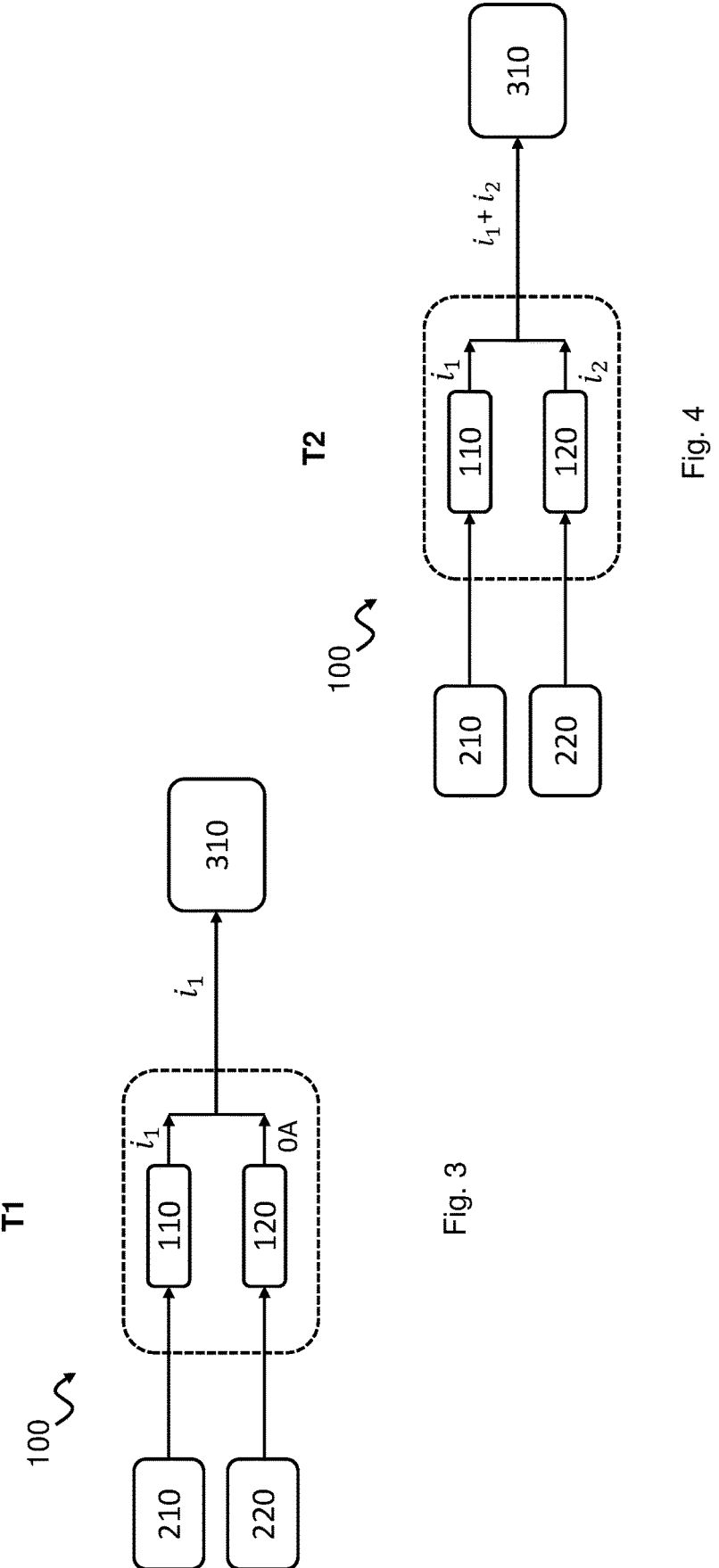
FIGS. 3-5 illustrate an overlap circuit according to embodiments of the invention.
Figures 24, 25:
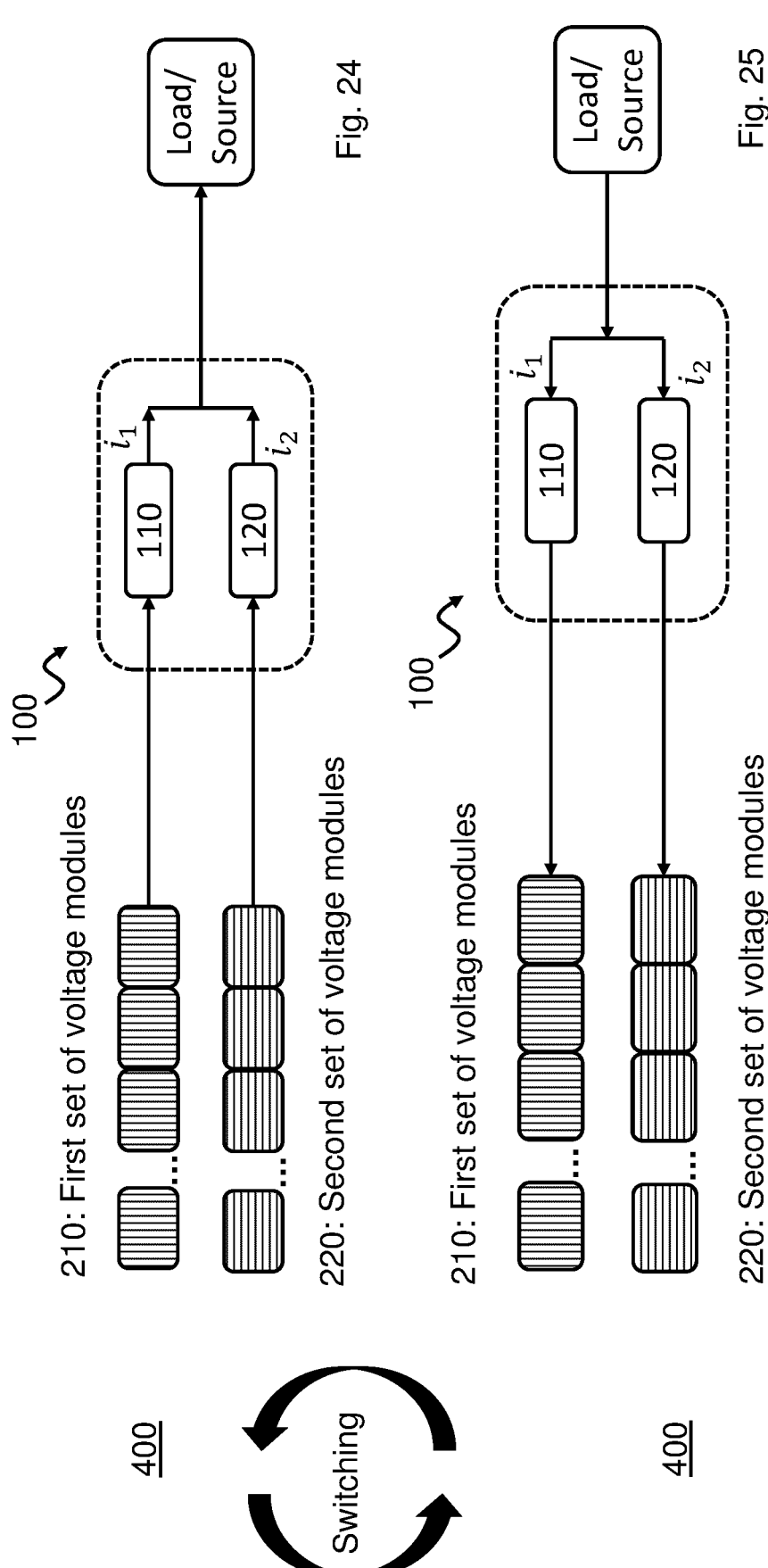
FIGS. 24 and 25 illustrates further aspects of the invention.

FIGS. 1 and 2 shows an overlap circuit according to a first aspect and a second aspect of the invention, respectively. In FIG. 1 two separate power sources feed a common load with an overlap circuit as the intermediate circuit for power transfer whilst in FIG. 2 one common power source feeds two separate loads with an overlap circuit as the intermediate circuit for power transfer. It is noted that the overlap circuit may also switch between the first and second aspects of the invention as illustrated in FIGS. 24 and 25.

With reference to FIGS. 1 and 3-5, embodiments of the invention relate to an overlap circuit 100 for a power system 400 according to the first aspect. The overlap circuit 100 herein disclosed comprises a first controllable switch 110 comprising a first input 112 configured to be coupled to a first power source 210 and a first output 114 configured to be coupled to a load 310. The overlap circuit 100 further comprises a second controllable switch 120 comprising a second input 122 configured to be coupled to a second power source 220 and a second output 124 configured to be coupled to the load 310. According to the invention: i) during a first time period T1, the first controllable switch 110 is configured to feed a first current $i_1$ from the first power source 210 to the load 310 when the second controllable switch 120 is configured to block a second current $i_2$ from the second power source 220 to the load 310; ii) during a second time period T2 following the first time period T1, the first controllable switch 110 is configured to feed a first current $i_1$ from the first power source 210 to the load 310 when the second controllable switch 120 is configured to feed a second current $i_2$ from the second power source 220 to the load 310; and iii) during a third time period T3 following the second time period T2, the first controllable switch 110 is configured to block a first current $i_1$ from the first power source 210 to the load 310 when the second controllable switch 120 is configured to feed a second current $i_2$ from the second power source 220 to the load 310.

The second time period T2 therefore defines a time period when both the first and second power sources delivers current to the load at the same time. This time period may therefore be denoted an overlap power transfer time period. It is known that in conventional solutions the power transfer is not overlapping but instead separated using so called deadtimes. More about this will be explained in the following disclosure.

The power system 400 may be any electrical power system comprising any number of power sources, power loads, power subsystems and suitable electrical infrastructure for coupling the components, devices and subsystems of the power system. The power source may be an electrical device or an electrical subsystem configured to provide electrical power. The load may be denoted a power consumer, i.e. an electrical device configured to use electrical power for its functioning. Electrical power or simply power may be given in watts and conventionally be defined as the voltage times the current in a given circuit and moment.

In embodiments of the invention, iv) during a fourth time period T4 following the third time period T3, the first controllable switch 110 is configured to feed a first current $i_1$ from the first power source 210 to the load 310 when the second controllable switch 120 is configured to feed a second current $i_2$ from the second power source 220 to the load 310. This case is not shown in the FIGS. but it is understood that the time period T4 is also an overlap time period when both the first and second power sources feeds/supply current to the load 310 at the same time. Moreover, steps i) to iv) described previously may be repeated any number of times according to embodiments of the invention.

It is also herein disclosed different methods for switching between the different steps i) to iv) of the invention according to the first aspect. Generally, different conditions may be set or used for switching from state i) to ii). The conditions may relate to the output voltage of the first power source and its associated threshold parameters and/or the output voltage of the second power source and its associated threshold parameters.

Therefore, in embodiments of the invention, the overlap circuit is configured to switch from i) to ii) when an output voltage of the first power source 210 is smaller than a first threshold voltage $V_{Th1}$; and/or switch from i) to ii) when an output voltage of the second power source 220 is larger than a second threshold voltage $V_{Th2}$. The first threshold voltage $V_{Th1}$ may be dependent a nominal voltage $V_n$ of the load 310, and/or the second threshold voltage $V_{Th2}$ is dependent on at least one of the first threshold voltage $V_{Th1}$ and the nominal voltage $V_n$ of the load 310. A nominal voltage of the load 310 can be understood as an expected voltage of the load, an operating voltage of the load, a working voltage of the load, etc. Different types of nominal voltages may be considered. One type is static or more or less constant, meaning a constant nominal voltage value, e.g. for a load demanding a constant power. Another type is when the nominal voltage value takes discrete values which e.g. may be predefined, e.g. different power levels of a microwave oven. Yet another type is when the nominal voltage value can take continuous values, e.g. an electrical motor of a vehicle such as a car or a truck.

As aforementioned, the first threshold voltage $V_{Th1}$ may be lower than the nominal voltage $V_n$ of the load 310 which means that the load 310 has drained the power of the first power source 210 to some extent. However, for proper functioning of the load 310 the output voltage should not drop to much and therefore in further embodiments of the invention the first threshold voltage $V_{Th1}$ is larger than 90% of the nominal voltage $V_n$ of the load 310. It is however noted that the percentage of the nominal voltage is dependent on the application or type of the load and hence in embodiments of the invention, the first threshold voltage $V_{Th1}$ is larger than X % of the nominal voltage $V_n$ of the load, where X % is dependent on or based on the proper functioning of the load. In other words, the lower limit for the load to work or operate properly.

Another type of conditions primarily relates to the output voltage of the second power source 220 but it will be envisaged that such conditions may also in turn depend on the conditions related to the output voltage of the first power source previously described. The second threshold voltage $V_{Th2}$ may be higher or equal to a nominal voltage $V_n$ of the load. It has further been realised that the second threshold voltage $V_{Th2}$ may be dependent on at least one of the first threshold voltage $V_{Th1}$ and the nominal voltage $V_n$ of the load 310. For example, the second threshold voltage $V_{Th2}$ may be higher than the first threshold voltage $V_{Th1}$ and the nominal voltage $V_n$.

In embodiments of the invention, it is further determined a difference voltage between the first threshold voltage $V_{Th1}$ and the nominal voltage $V_n$ of the load 310, and then the second threshold voltage $V_{Th2}$ is determined based on such a difference voltage. For example, the second threshold voltage $V_{Th2}$ may be set as the nominal voltage plus the difference voltage. A non-limiting example would be: nominal voltage $V_n$=200 V, first threshold voltage $V_{Th1}$=190 V, which means that 200–190=10 V is the difference voltage and hence the second threshold voltage $V_{Th2}$ is set to 10+200=210 V. The skilled person understands that when the system returns back from state iii) to state i) the aforementioned conditions can be applied, mutatis mutandis.

Moreover, in further embodiments of the invention, the first power source 210 is configured to act as a first load, the second power source 220 is configured to act as a second load and the load 310 is configured to act as a common power source; and further that the first controllable switch 110 is configured to feed a first current $i_1$ from the common power source to the first load when the second controllable switch is configured to feed a second current $i_2$ from the common power source to the second load. This means that the direction of the current is reversed in these embodiments. More of this will be explained in relation to FIGS. 20 and 21. However, it may be noted that the mentioned first input and first output may be configured to act as first output and first input instead. Hence, first input and first output may simply be denoted as first electrical connections, first connection points, first coupling nodes, etc.

However, as previously mentioned according to a second aspect of the invention one common power source feeds two separate loads. With reference to FIG. 2, the overlap circuit 100 in this case comprises: a first controllable switch 110 comprising a first input 112 configured to be coupled to a power source 310 and a first output 114 configured to be coupled to a first load 210. The overlap circuit 100 further comprises a second controllable switch 120 comprising a second input 122 configured to be coupled to the power source 310 and a second output 124 configured to be coupled to a second load 220. According to the invention: i) during a first time period T1, the first controllable switch 110 is configured to feed a first current $i_1$ from the power source 310 to the first load 210 when the second controllable switch 120 is configured to block a second current $i_2$ from the power source 310 to the second load 330; ii) during a second time period T2 following the first time period T1, the first controllable switch 110 is configured to feed a first current $i_1$ from the power source 310 to the first load 210 when the second controllable switch 120 is configured to feed a second current $i_2$ from the power source 310 to the second load 220; and iii) during a third time period T3 following the second time period T2, the first controllable switch 110 is configured to block a first current $i_1$ from the power source 310 to the first load 210 when the second controllable switch 120 is configured to feed a second current $i_2$ from power source 310 to the second load 220.

It may be noted that the general principles of the invention previously disclosed and explained with reference to FIGS. 1 and 3-5 for the first aspect of the invention, mutatis mutandis, also applies to the second aspect of the invention. Therefore, in embodiments of the invention, iv) during a fourth time period T4 following the third time period T3, the first controllable switch 110 is configured to feed a first current $i_1$ from the power source 310 to the first load 210 when the second controllable switch 120 is configured to feed a second current $i_2$ from the power source 310 to the second load 220. Moreover, steps i) to iv) described previously may be repeated any number of times according to embodiments of the invention. Hence, also for the second aspect of the invention, an overlap time period(s) is defined.

The first load 320 and the second load 330 are to be interpreted in a very general way. This implies that mentioned first and second loads may be any power consumers but also electrical energy storage devices such as batteries and battery systems.

It is also herein disclosed different methods for switching between the different steps i) to iv) of the invention according to the second aspect. Generally, different conditions may be set or used for switching from state i) to ii). The conditions may relate to a voltage of the first load and its associated threshold parameters and/or the voltage of the second load and its associated threshold parameters.

Therefore, in embodiments of the invention the overlap circuit 100 is configured to switch from step i) to ii) when a voltage over the first load 210 is higher than a first threshold voltage $V_{Th1}$; and/or switch from i) to ii) when a voltage over the second load 220 is smaller than a second threshold voltage $V_{Th2}$. The first threshold voltage $V_{Th1}$ may be dependent a nominal voltage $V_n$ of the first load 210, and/or the second threshold voltage $V_{Th2}$ is dependent on a nominal voltage $V_n$ of the second load 220.

Moreover, in further embodiments of the invention, the first load 210 is configured to act as a first power source, the second load 220 is configured to act as a second power source and the power source 310 is configured to act as a common load; and further that the first controllable switch 110 is configured to feed a first current $i_1$ from the first power source to the common load when the second controllable switch is configured to feed a second current $i_2$ from the second power source to the common load. This means that the direction of the current is reversed in these embodiments. More of this will be explained in relation to FIGS. 20 and 21. However, it may be noted that the mentioned second input and second output may be configured to act as second output and second input instead. Hence, second input and second output may simply be denoted as second electrical connections, second connection points, second coupling nodes, etc.

Figures 5, 6:
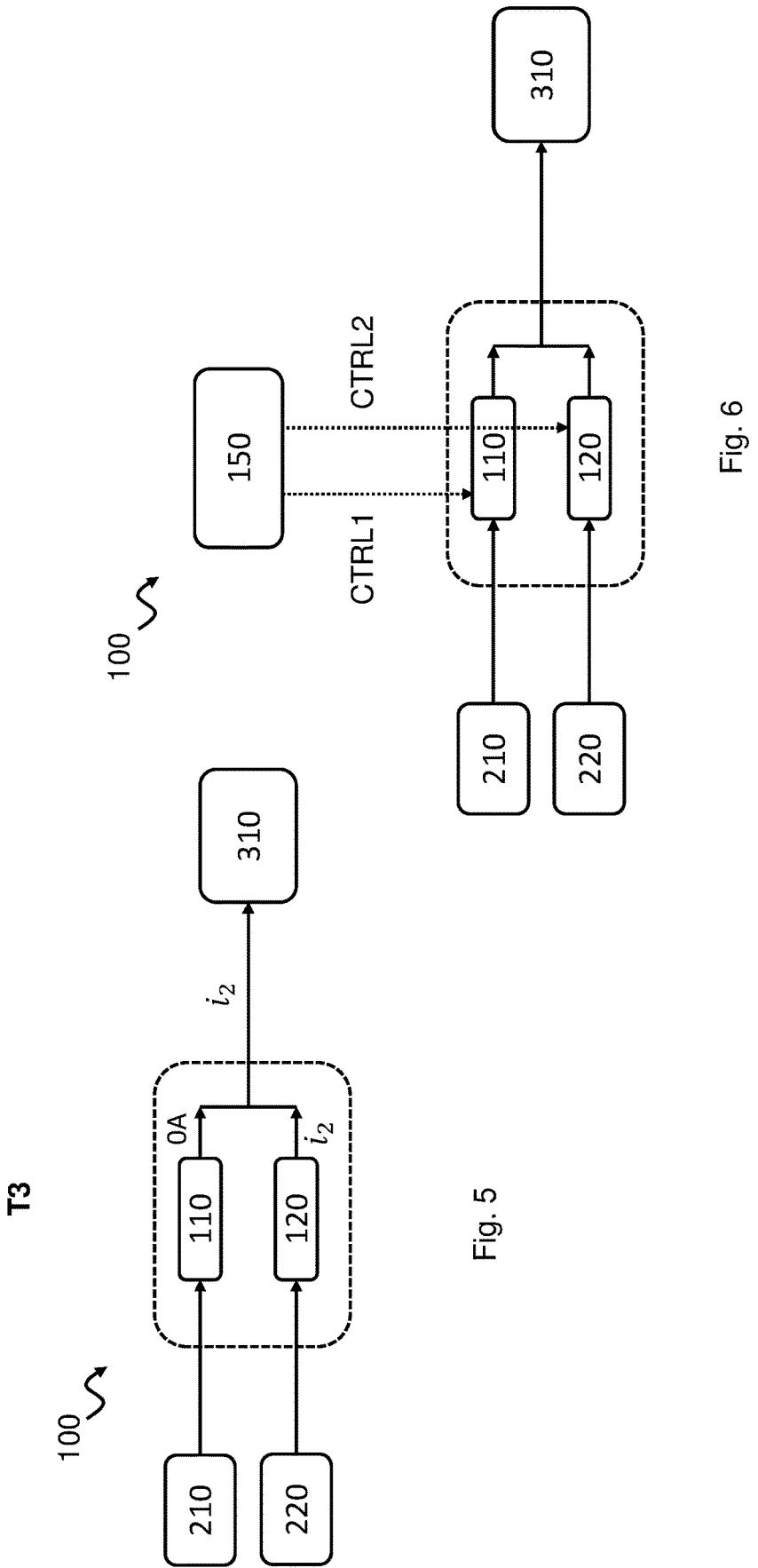
FIG. 6 shows an embodiment of the invention including a control device.

In embodiments of the invention, the overlap circuit 100 may comprise a control device/arrangement 150 being electrically coupled to the first controllable switch 110 and second controllable switch 120 as shown in FIG. 6. The control device 150 may operate using a switching or a clock frequency when controlling the different components of the system. The control device 150 may use same or different clock frequencies for different components and applications. The control device 150 is configured to provide first control signals CTRL1 to the first controllable switch 110 for controlling the first controllable switch 110. The control device 150 is further configured to provide second control signals CTRL2 to the second controllable switch 120 for controlling the second controllable switch 120. To obtain the overlapping mechanism herein disclosed the first control signals CTRL1 and the second control signals CTRL2 are so configured that the first controllable switch 110 and the second controllable switch 120 both are conductive during the second time period T2 thereby feeding currents to the load 310.

It is to be noted that even though the case for the second aspect is not shown it is realised that the overlap circuit according to the second aspect also may include the control device 150 and operate according to the herein described principles of control signalling clocking. Therefore, the first control signals CTRL1 and the second control signals CTRL2 are according to the second aspect configured such that the first controllable switch 110 and the second controllable switch 120 both are conductive during the second time period T2 thereby feeding currents to the first load 210 and the second load 220, respectively, see FIG. 2.

More specifically, the first control signals CTRL1 and the second control signals CTRL2 may comprise ON signals and OFF signals, e.g. ones and zeros (1/0). An ON signal sets a controllable switch, such as the first controllable switch 110 and second controllable switch 120, in a conductive mode and an OFF signal sets a controllable switch in a non-conductive mode. Hence, in the conductive mode a current can pass through the controllable switch while in the non-conductive more the current is blocked and cannot pass through the controllable switch. With this reasoning the first control signals CTRL1 and the second control signals CTRL2 may be simultaneous or non-simultaneous clocked in relation to each other which may mean that the first and second control signals are sent or received at the same time instance or in different time instances. Both simultaneous or non-simultaneous clocked control signalling works well. In the latter case when the first control signals CTRL1 and the second control signals CTRL2 are non-simultaneous clocked there may be time offset between CTRL1 and CTRL2.

Figures 7, 8:
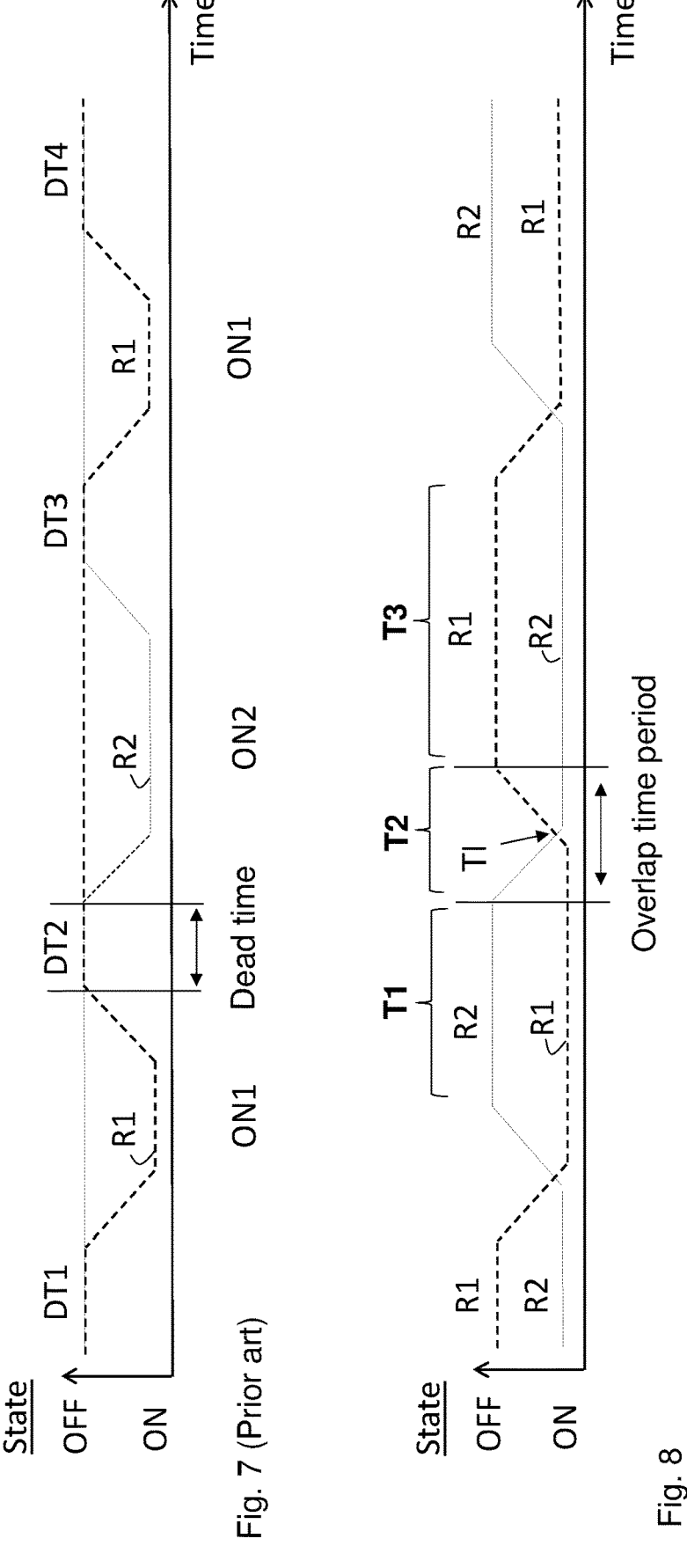
FIGS. 7-9 illustrate different aspects of controlling the controllable switches.

FIG. 7 shows control signalling according to prior art while FIG. 8 shows examples of control signalling according to embodiments of the invention. In FIGS. 7 and 8, the x-axis shows time and the y-axis OFF state and ON state of respective controllable switches. It may be noted that when a control signal is received by a controllable switch there is always a delay from non-conductivity to fully conductivity mode or state, or vice versa, which may be denoted raise time and fall time before the component is in fully conductive mode (ON) or in blocking mode (OFF). Further, a switch may also be represented as variable resistance having a varying resistivity with mentioned raise and fall times.

In FIG. 7, it is shown exemplary deadtimes DTs, i.e. DT1-DT4, according to prior art. During such deadtimes no current is provided to the load since both resistors are in non-conductive or blocking mode, i.e. OFF. Between the deadtimes, each switch passes or feeds a current to the common load but never at the same time. Hence, during time period ON1 only a first switch is in ON state is passing current to the load. After deadtime DT2 during time period ON2 only a second switch is in ON state is passing current to the load as shown in FIG. 7.

FIG. 8 on the other hand shows when the first and second controllable switches are controlled according to embodiments of the invention with overlapping power transfer conductivity. It is firstly noted that no deadtimes exists at all in FIG. 8. This may be formulated such that according to the invention there is no time period when both the first and second controllable switches are in non-conductive mode, i.e. in OFF state. Further, overlap or overlapping time periods are shown in FIG. 8, and during such an overlap power transfer time period both the first (ON state) and second (ON state) controllable switches are conductive and hence pass current to the load at the same time period. For example, during a first time period T1 the first controllable switch is conductive when the second controllable switch is non-conductive, and during the second time period T2 both the first and second controllable switches are conductive. It is however to be noted that during the second time period T2, the resistance R1 of the first controllable switch is raising from fully conductive to fully non-conductive state while the resistance R2 of the second controllable switch is decreasing from fully non-conductive to fully conductive state. This also means that the current via the first controllable switch will decrease accordingly and the current via the second controllable switch will increase accordingly during the second time period T2. During the third time period T3 the second controllable switch is conductive when the first controllable switch is blocking.

Figure 9:

It may further be noted that there is a certain time instance when the first and second controllable switches will have the same resistance values marked TI in FIG. 8, and FIG. 9 shows more in detail such time instances disclosing two different examples TI1 and TI2. The vertical lines in FIG. 9 illustrates control signal CTRL1, CTRL2 instances or clocking instances. In a first example the control signals for the first and second controllable switches are simultaneously clocked, denoted "Sim." in FIG. 9, compared to a second example in which the control signals are non-simultaneously clocked, denoted "non-sim." in FIG. 9.

In the first example in FIG. 9 during a first time period T1 only the first controllable switch is conductive. During second timer period T2 when Sim. 1 is clocked R1 starts to increase and at the same time R2 starts to decrease and both first and second controllable switches are hence conductive during T2. At time instance TI1, the resistivity of R1 equals R2, R1=R2. During the third time period T3 only the second controllable switch is conductive and the first controllable switch is therefore blocking. Hence, this is an example when there is no time offset in the clocking of control signals CTRL1 and CTRL2.

In the second example in FIG. 9, the situation during the first timer period T1 is the same as in the first example. However, during time period T2" a clocking time offset is introduced between CTRL1 and CTRL2 signals which may mean that time period T2" is extended in time compared to time period T2. During time period T2" the value of R1" is increasing while the value of R2 is decreasing. The clocking offset means that a time instance 112 when the resistivity of R1" equals R2, R1'=R2, is offset in time leading to a lower resistivity and hence higher current compared to the first example. Thereby, the current delivered to the load can be controlled by controlling the time offset.

It has therefore been realised that according to the first aspect of the invention, the time offset may be dependent on at least one of: a current provided to the load 310, a voltage difference between the first power source 210 and the second power source 220, and a resistance value when a resistance R1 of the first controllable switch 110 equals a resistance R2 of the second controllable switch 120.

Correspondingly, according to the second aspect of the invention, the time offset may be dependent on at least one of: current provided to the first load 210 and a current provided to the second load 220, a voltage difference between the first load 210 and the second load 220, and a resistance value when a resistance R1 of the first controllable switch 110 equals a resistance R2 of the second controllable switch 120.

FIGS. 10 to 14 illustrate further details of control methods according to embodiments of the first aspect of the invention, when the first controllable switch 110 comprises a first diode 116 coupled in parallel with a first variable resistor 118 between a first input 112 and a first output 114, and the second controllable switch 120 comprises a second diode 126, 126' coupled in parallel with a second variable resistor 128 between the second input 122 and the second output 124. In FIGS. 10-14 the sequential time order T11, T12, T2, T31 and T32 is explained.

Figure 10:
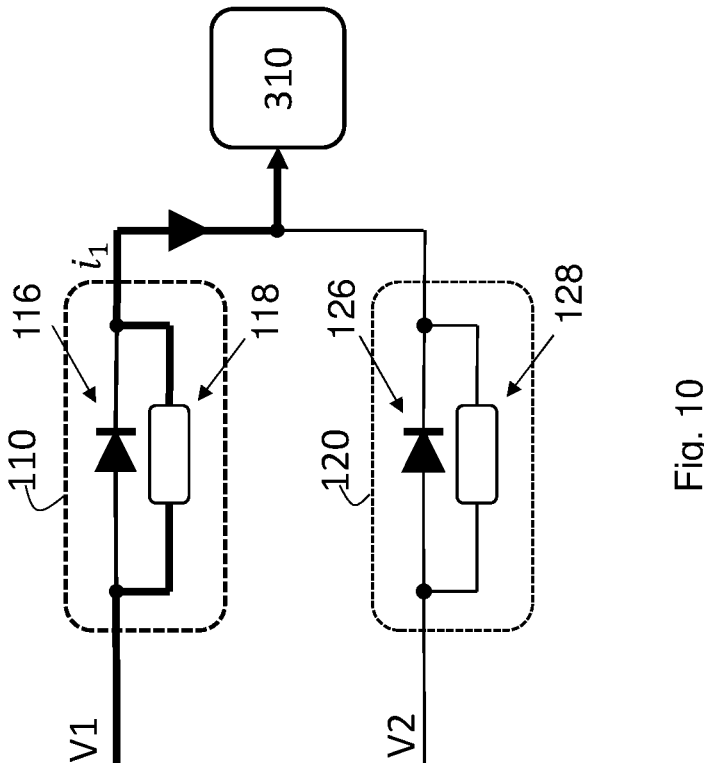
FIGS. 10-14 illustrate an overlap circuit according to embodiments of the invention.

In FIG. 10 during time period T11, the first variable resistor 118 is configured to provide a first current $i_1$ to the load 310 for minimum resistance instead of passing via the first diode 116. This means minimum losses.

Figure 11:
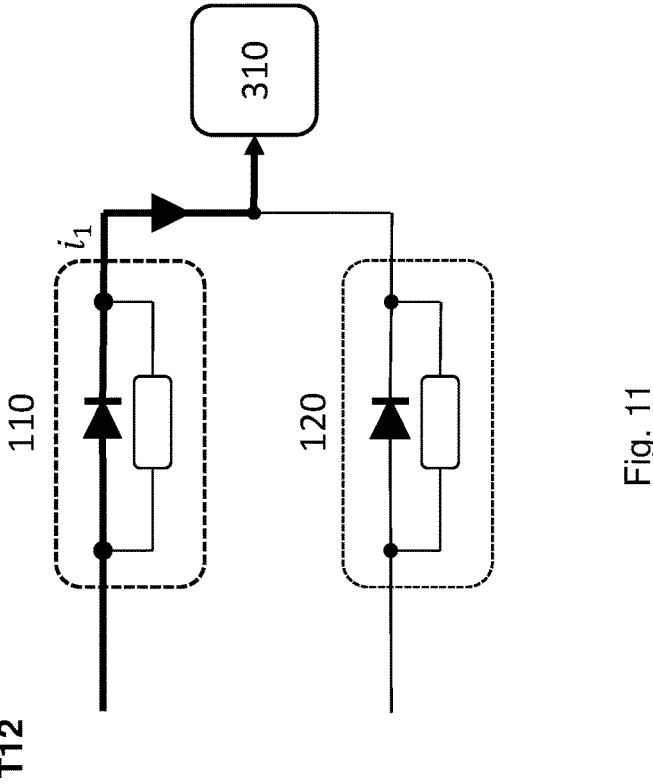

In FIG. 11 during first time period T12, the first diode 116 is configured to provide a first current $i_1$ to the load 310 instead of the first variable resistor 118 so as to be prepared to block possible current flowing from the second power source in a next coming time period.

Figure 12:
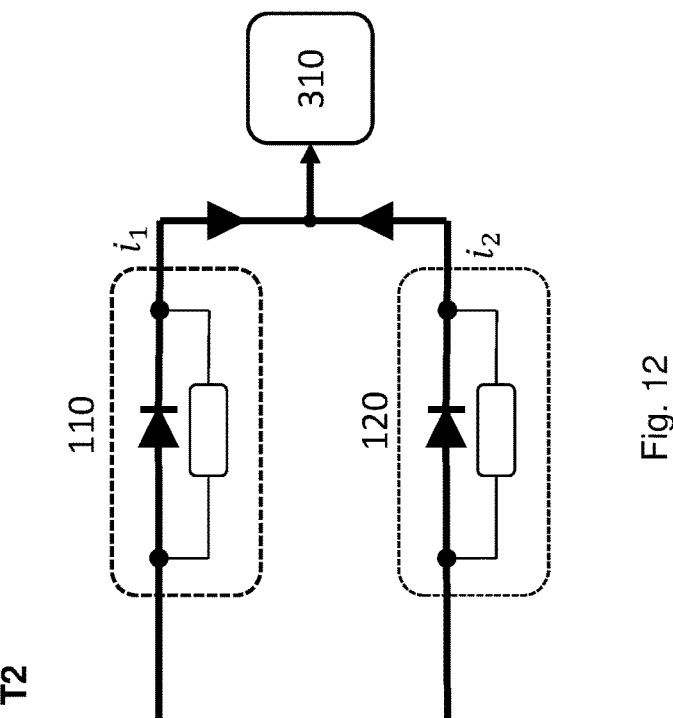

In FIG. 12 during time period T2, the first diode 116 is configured to provide a first current $i_1$ to the load 310 and simultaneously the second diode 126 is configured to provide a second current $i_2$ to the load 310 thereby no current can pass from the first power sources to the second power source, and vice versa.

Figure 13:
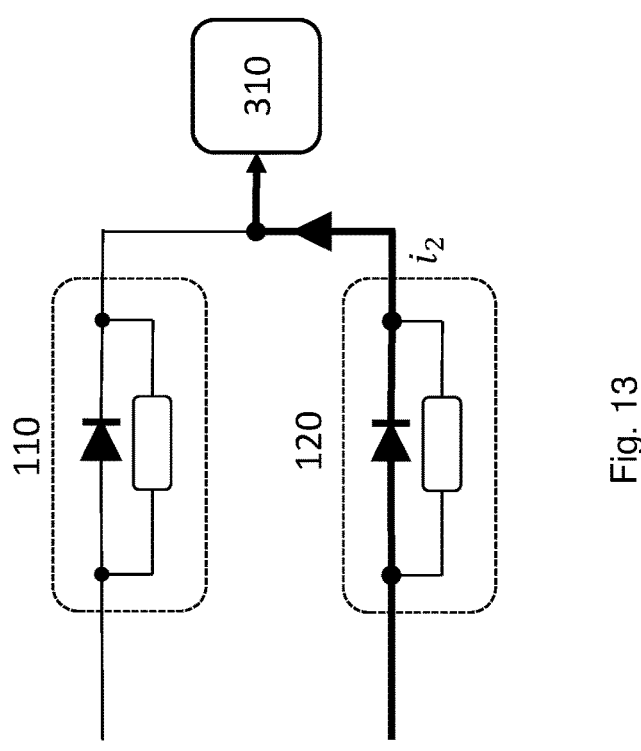

In FIG. 13 during time period T31, the second diode 126 is configured to provide a second current $i_2$ to the load 310 so that possible current from the first power source is blocked.

Figure 14:
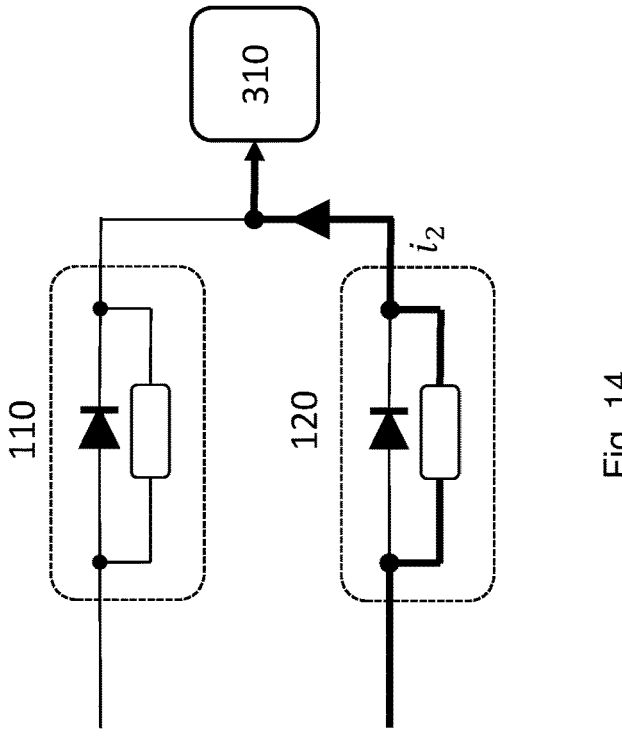

In FIG. 14 during time period T32, the second variable resistor 128 is configured to provide a second current $i_2$ to the load 310 for minimum resistance.

Even though, the FIGS. 10-14 do not show the case for the second aspect of the invention it is to be realised that the sequential control order can be applied thereto. In such embodiments of the second aspect of the invention, the first controllable switch 110 comprises at least one first diode 116, 116' coupled in parallel with at least one first variable resistor 118, 118' between the power source 310 and the first load 210. The second controllable switch 120 comprises at least one second diode 126, 126' coupled in parallel with at least one second variable resistor 128, 128' between the power source 310 and the second load 220. During the first time period T1, the first variable resistor 118 is configured to provide a first current $i_1$ to the first load 210 and subsequently the first diode 116 is configured to provide a first current $i_1$ to the first load 210. During the second time period T2, the first diode 116 is configured to provide a first current $i_1$ to the first load 210 and the second diode 126 is configured to provide a second current $i_2$ to the second load 220. During the third time period T3, the second diode 126 is configured to provide a second current $i_2$ to the second load 220 and subsequently the second variable resistor 128 is configured to provide a second current $i_2$ to the second load 220.

FIGS. 15-19 illustrates embodiments of the first aspect of the invention when the first controllable switch 110 comprises two first diodes 116, 116' coupled in series with each other in opposite directions between the first input 112 and the first output 114, and when the second controllable switch 120 comprises two second diodes 126, 126' coupled in series with each other in opposite directions between the second input 122 and the second output 124.

Figure 15:
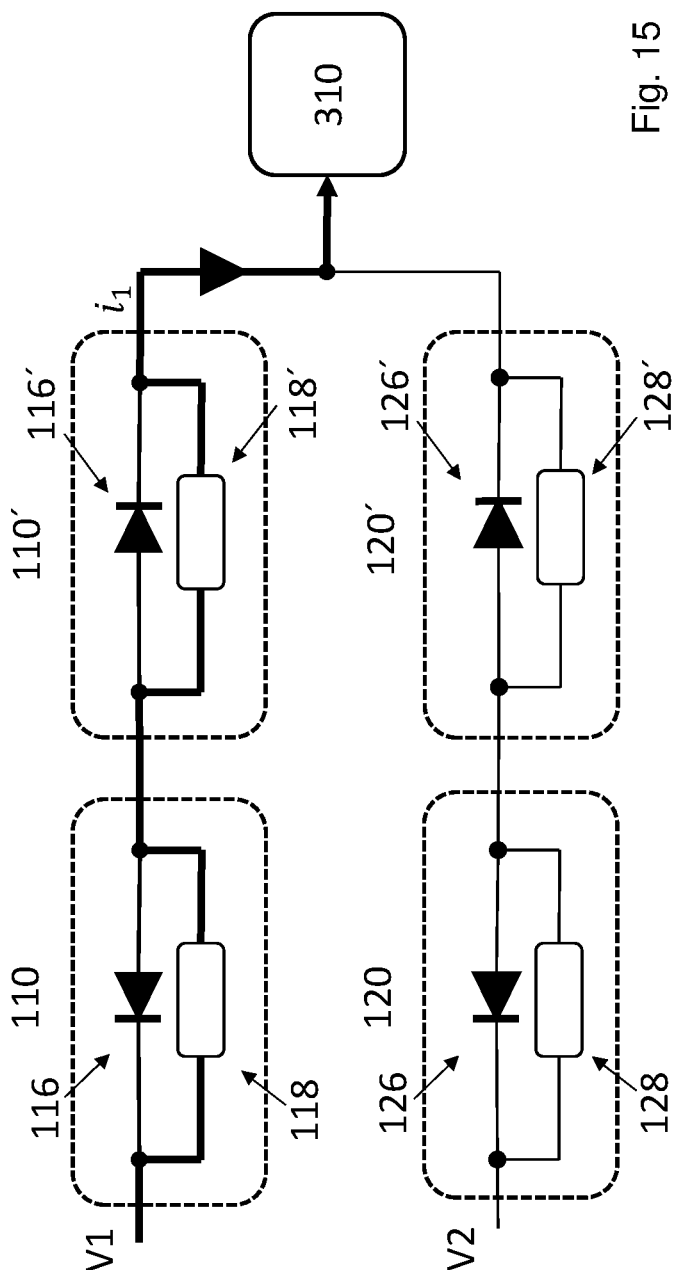

In FIG. 15 during time period T11, the first current from the first power source passes through the resistors 118 and 118' for minimum resistance and therefore minimum losses.

Figure 16:
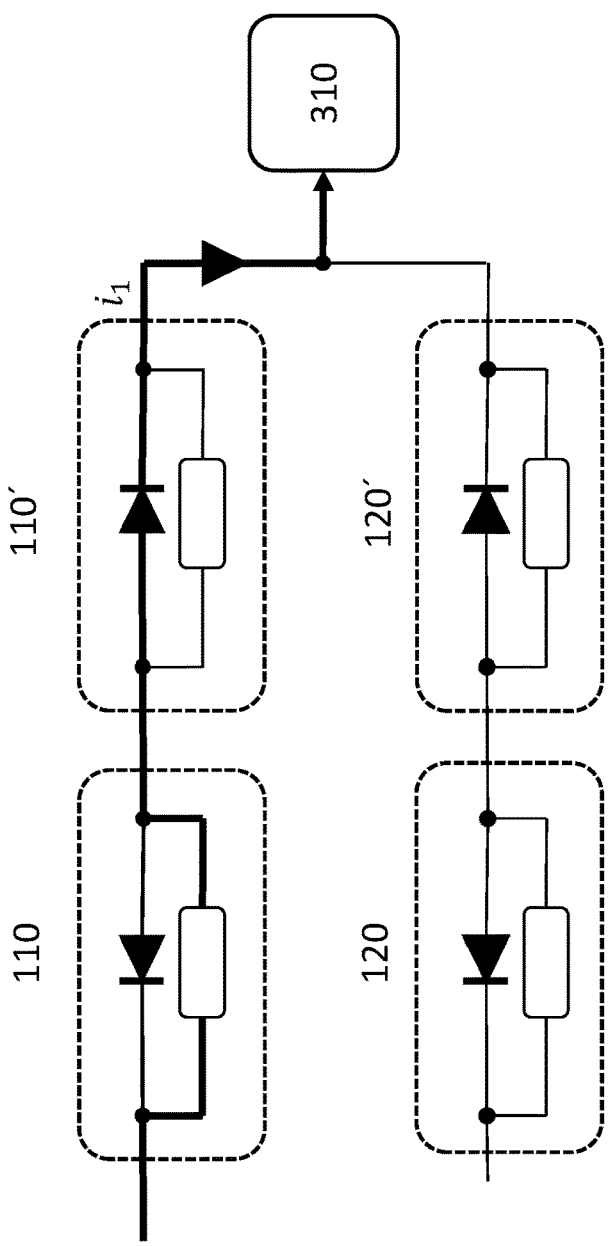

In FIG. 16 during time period T12, when the voltage of the first power source starts to fall the first current from the first power source is fed through the resistor 118 and the diode 116' so as to be prepared to block possible current flowing from the second power source in the next time period.

In FIG. 17 during time period T2, the first current passes via the first resistor 118 and the first diode 116', when the second current from the second power source passes via the second resistor 128 and the second diode 126'. Hence, no current can pass from the first power sources to the second power source, and vice versa, during T2.

Figure 18:
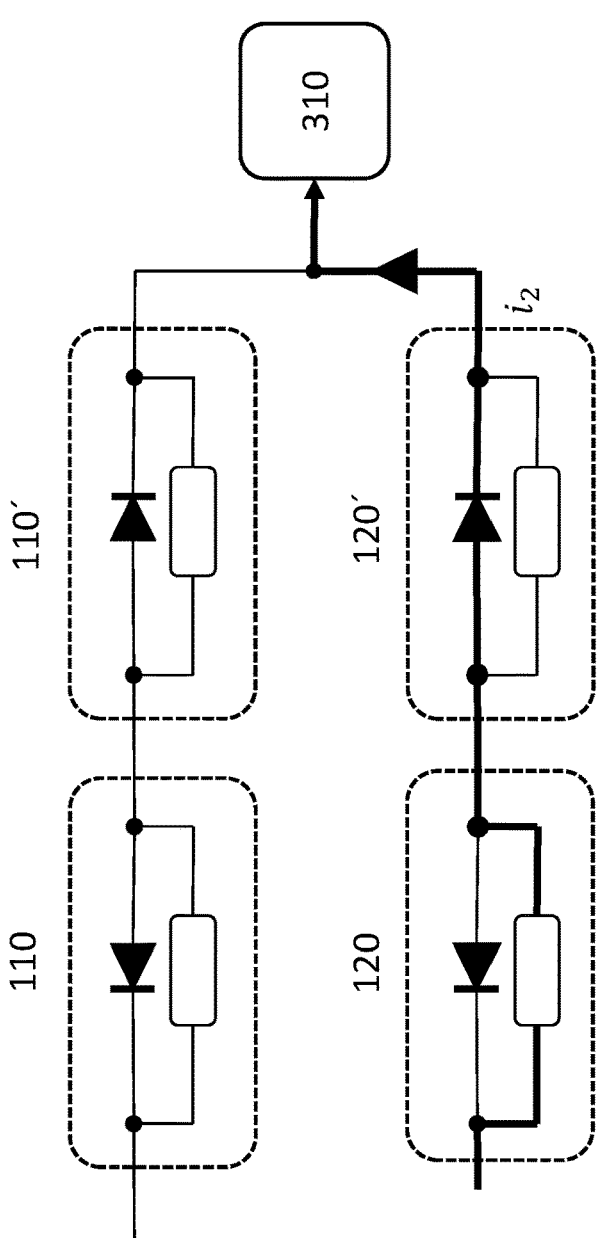

In FIG. 18 during time period T31, the second current is fed via the second resistor 128 and the second diode 126'. At the same time no first current is fed to the load 310.

Figure 19:
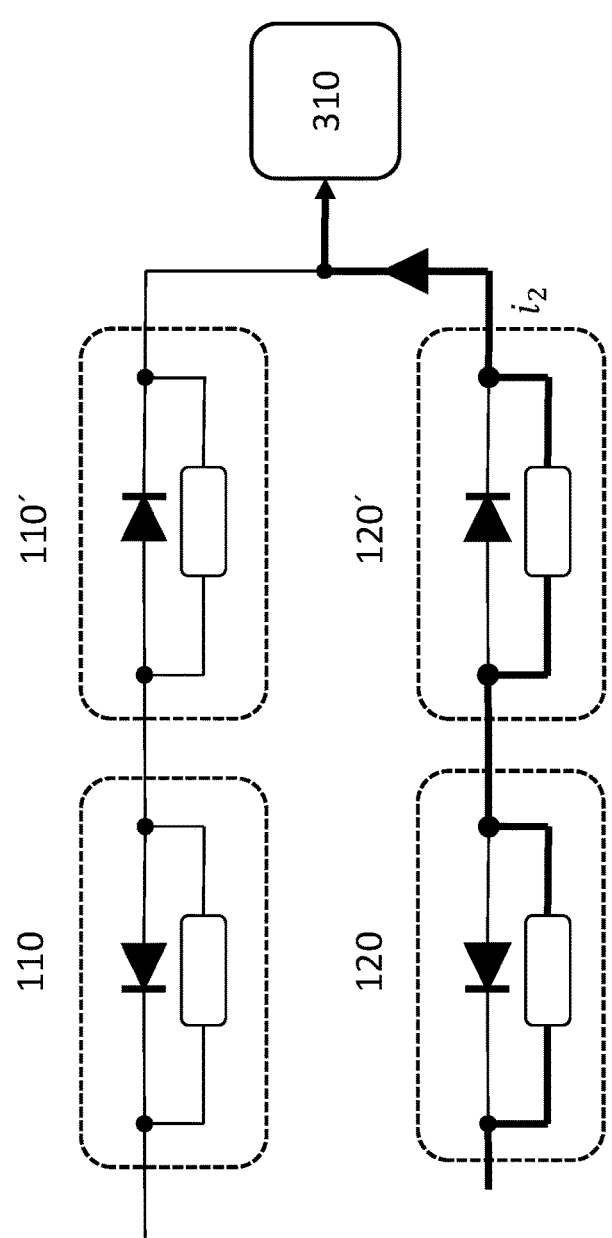

In FIG. 19 during time period T32, the second current from the second power source passes through the second resistors 118 and 118' for minimum resistance and therefore minimum losses.

The control sequence shown in FIGS. 15-19 for the first aspect of the invention may also be applied in embodiments of the invention according to the second aspect of the invention. Hence, the first controllable switch 110 may comprise two first diodes 116, 116' coupled in series with each other in opposite directions between the power source 310 and the first load 210, and the second controllable switch 120 comprises two second diodes 126, 126' coupled in series with each other in opposite directions between the power source 310 and the second load 220.

Figure 21:
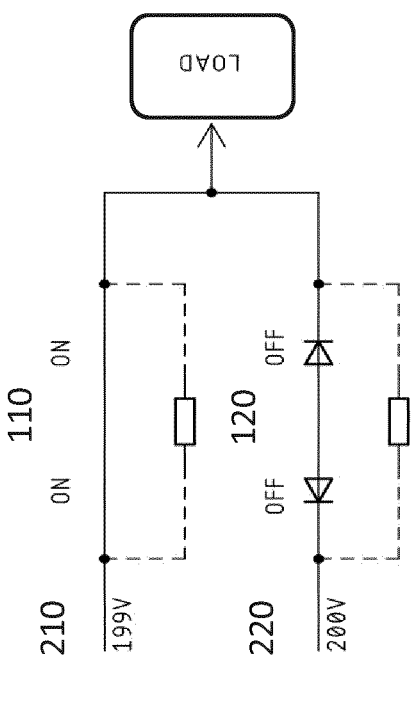
FIG. 21 shows a state diagram for a two-switch implementation according to embodiments of the invention.
Figure 21:
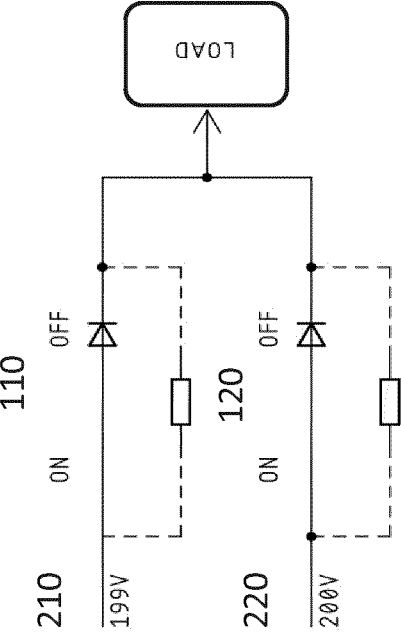
Figure 21:
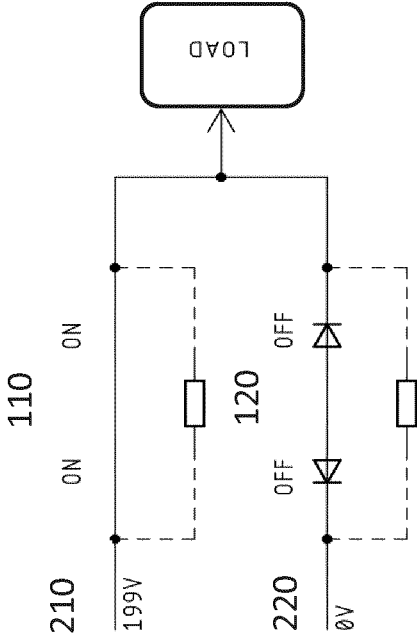
Figure 21:
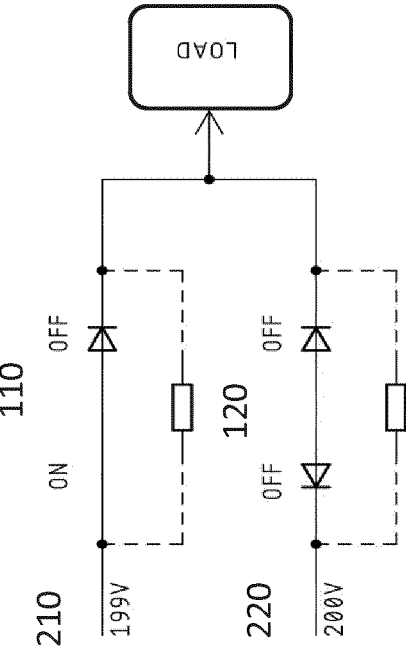
Figure 21:
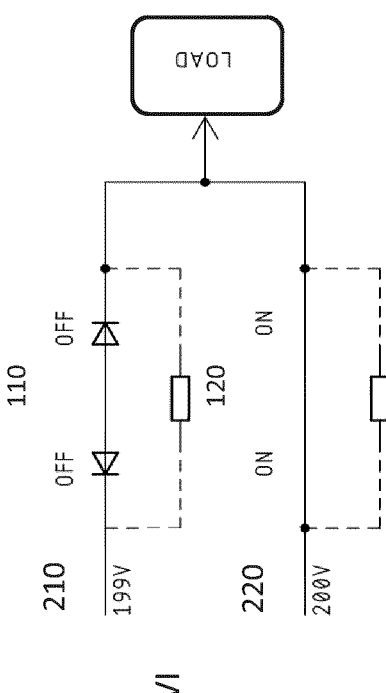
Figure 21:
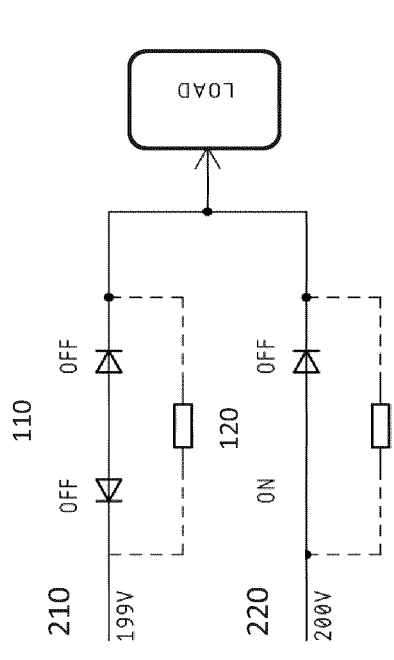
Figure 21:
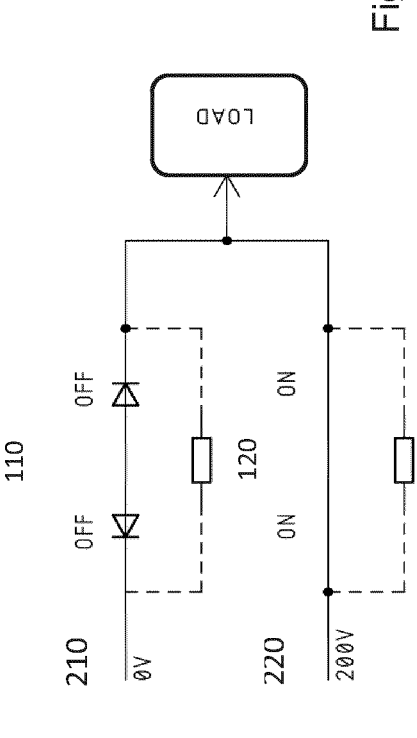

With reference to FIGS. 20 and 21 further aspects and embodiments of the invention will now be presented. FIGS. 20a and 20b illustrates a switching diagram for a one switch case. In FIG. 20a the first 210 and second 220 power sources and its switches 110, 120 are illustrated. Also, the load 310 and the how the current flows (bold lines and arrows) is shown in FIG. 20a.

At I in FIG. 20b, the first power source 210 is active (first output voltage=200 V) and is feeding the load 310 since its switch 110 is in ON mode. The second power source 220 is non-active (second output voltage=0 V) and its switch 120 is in OFF mode.

At II in FIG. 20b, the first power source 210 is still feeding the load 310 but the first output voltage has dropped to 198 V due to the previous feeding of the load 310.

At III in FIG. 20b, the first power source 210 is still feeding the load but its switch 110 has been set in OFF mode which means that the switch is not fully conductive but is still conductive through its body diode. When the current flows a body diode of a transistor there will be losses over the body diode.

At IV in FIG. 20b, the first power source 210 is still feeding the load 310 but also the second power source 220 has been activated and feeds the load 310 with 200 V but its switch 120 is in OFF mode which means that the current flows through the body diode. This is a feeding overlap time period or state.

At V in FIG. 20b, the second power source 220 feeds the load 310 via its switch 120 which is in ON mode. The first power source 210 does however not the feed the load 310 anymore but is still active (first output voltage=198 V).

At VI in FIG. 20b, the first power source 210 is non-active (first output voltage=0 V) and only the second power source 220 is feeding the load 310 with a second output voltage of 200 V.

FIG. 21 illustrates a switching diagram for the two-switch case when they are opposite coupled with each other in the current direction. The opposite coupling is used for preventing a current rush between the power sources of the system during time periods when they are active and coupled to each other. For simplicity, a switch in ON mode is illustrated as a conductor while a switch in OFF mode is illustrated with its body diode which is always conducting when its threshold voltage has been reached.

At I in FIG. 21, the first power source 210 is active (first output voltage=199 V) and feeds the load 310 as its switches 110 are in ON mode which also means that the first power source 210 can both feed and receive current. The second power source 220 is non-active (second output voltage=0 V) and its switches 120 are in OFF mode.

At II in FIG. 21, the first power source 210 is still active (first output voltage=199 V) and feeds the load 310 and the second power source 220 has been activated (second output voltage=200 V) but does not feed the load 310 as both its switches are in OFF mode.

At III in FIG. 21, the first power source 210 is still active (first output voltage=199 V) but switch 110 has been set in OFF mode so that the first power source 210 only can feed current but not receive any current so as to prevent current rush from the second power source 220. The second power source 220 is active but does not feed the load 200 since both its switches 120 are still in OFF mode.

At IV in FIG. 21, both the first power source 210 and second power source 220 feed the load 310 at the same time. This is the feeding overlapping timer period. Since the second output voltage (second output voltage=200 V) is higher than the first output voltage (first output voltage=199 V) the second power source 220 will successively take over the feeding of the load 310 from the first power source 210. Also, as previously mentioned there will be no current rush from second power source 220 to the first power source 210 since it is noted that both the first power source 210 and the second power source 220 only can feed current but not receive current due to their respective switching configuration.

At V in FIG. 21, the first power source 210 is still active (first output voltage=199 V) but is uncoupled from the load 310 as both its switches 110 have been set in OFF mode. The second power source 220 is active and is feeding the load 310 alone via the body diode of its switch 120 is in OFF mode so there will be a small power loss over the body diode.

At VI in FIG. 21, the second power source 220 is active and is feeding the load 310 but with both its switches 120 set in ON mode and hence no losses in any body diode will occur. The first power source 210 is still active (first output voltage=199 V) but uncoupled to the load 310.

At VII in FIG. 21, the first power source 210 is in non-active mode and hence the first output voltage is 0 V. The second power source 220 is however active and continues to feed the load 310.

When the second power source 220 has lost some of its power the first power source 210 may take over and feed the load 200 as described herein so that states I to VII are repeated.

Figure 22B:
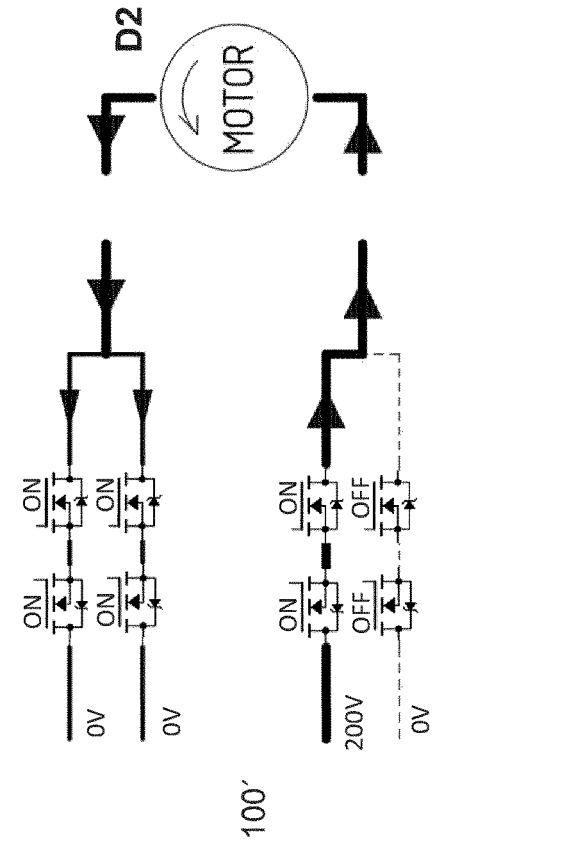
FIGS. 22 and 23 illustrates further embodiments of the invention.
Figure 22B:
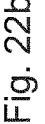
Figure 22A:
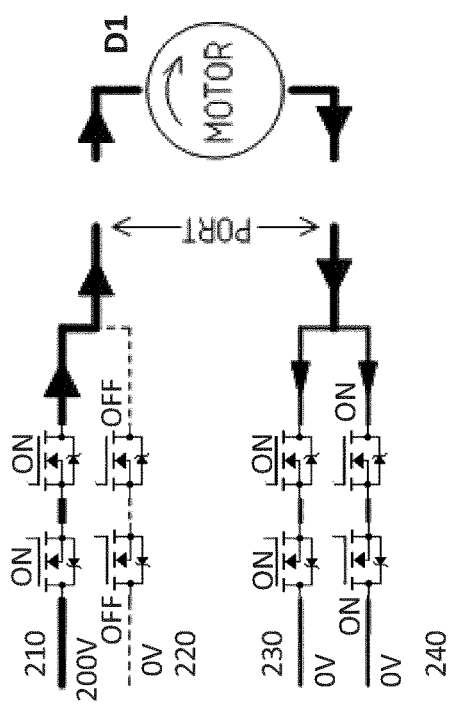

FIGS. 22a and 22b illustrates yet further embodiments of the invention when a load such an electrical motor is operating in a first direction D1, such as a forward direction, and in a second direction D2 opposite to the first direction D1 such as a reverse direction. Therefore, the system may comprise a third power source/load 230 and a fourth power/source 240 connected to the electrical motor. In FIG. 22a it is illustrated that the first power source is active (first output voltage=200 V) and its switches are in ON mode and is driving the electrical motor in the first direction D1. The second power source on the other hand is non-active (0V) and its switches are in OFF mode. The current from flows through the electrical motor and to third and fourth power sources which are non-active but with their switches are in ON mode. However, in FIG. 22b the electrical motor is operating in the second direction D2. Therefore, any of the third and/or the fourth power sources can drive the electrical motor in the second reverse direction D2. In FIG. 22b it is illustrated how the third power source is active (third output voltage=200 V) and is driving the electrical motor in the second direction D1. Therefore, the current flows from third power source to the first power source and the second power source via the electrical motor.

Figure 23:
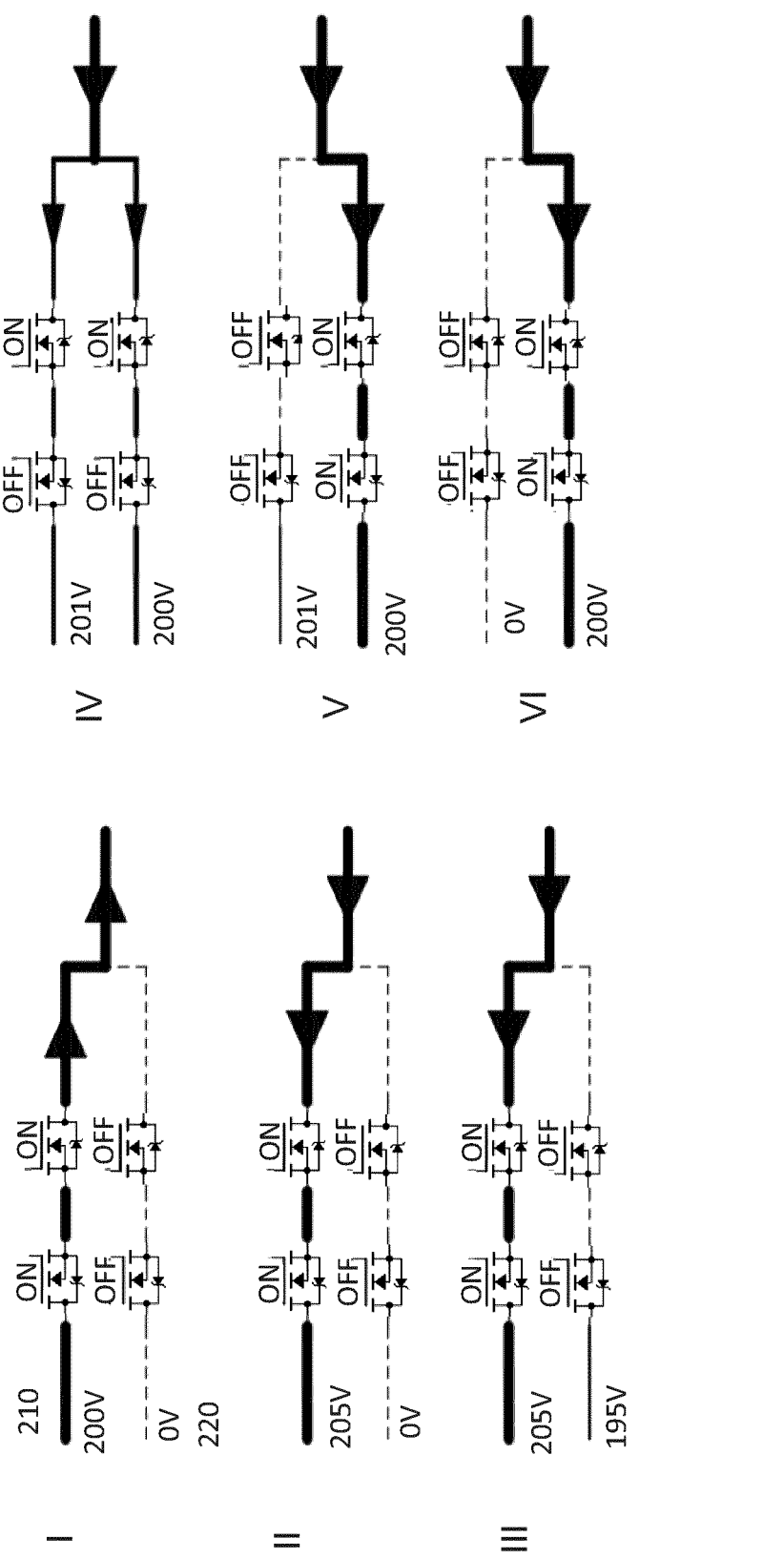

Moreover, FIG. 23 shows a state diagram when the system is recharged by an electrical motor according to embodiments of the invention. This can e.g. happen when a vehicle comprising an electrical motor is running down a descending road section, i.e. having a negative slope. Another exemplary case is when a vehicle is braking for reducing its speed. In such examples energy is transferred from the motor.

At I in FIG. 23, the first power source 210 is active (first output voltage=200 V) and its switches are in ON mode and hence drives the electrical motor. The second power source 220 is non-active (second output voltage=0 V) and its switches are in OFF mode.

At II in FIG. 23, the voltage of the electrical motor is higher than the first output voltage which means that the current will flow from the electrical motor to the first power source 210 and the first output voltage raises to 205 V.

At III in FIG. 23, the second power source 220 is activated (second output voltage=195 V) but its switches are still in OFF mode and hence the current still flows from the electrical motor to the first power source 210 only.

At IV in FIG. 23, a second switch from the second power source 220 is set to ON mode which means that the current from the electrical motor also flows to the second power source and the second output voltage raises to 200 V. Since the first output voltage has risen and is higher than the second output voltage it is time to load second power source.

At V in FIG. 23, the first power source 210 is still active (first output voltage=210 V) but its switches are in OFF mode and the current only flows the electrical motor to the second power source 220 which has both its switches in ON mode.

At VI in FIG. 23, the first power source 210 is deactivated (first output voltage=0 V) and can therefore be coupled to other non-active power sources for power/voltage sharing (not shown in the FIGS.). The second power source 220 is active and continue to be loaded by the electrical motor.

FIGS. 24 and 25 illustrates yet further aspects of the invention. Firstly, it may be noted that the overlap circuit 100 disclosed and explained in the present disclosure may be coupled to two different sets of voltage modules, i.e. a first set of voltage modules (or first power source) and a second set of voltage modules (or second power source). The voltage modules may be any modules holding or storing electrical power such as batteries. Also since the set of voltage modules are modular service on the set of voltage modules can be simplified. Further, the safety aspect is much improved since the voltage levels to be handled during service is only that of each module instead of a dangerously high voltage level of multiple connected batteries as in conventional solutions. Secondly, it may further be noted that the overlap circuit is further coupled to an electrical device acting as a load or a power source, such as an electrical motor.

It is known that an electrical motor may consume power or deliver power depending on its operation mode. For example, during normal operation an electrical motor of an electrical vehicle consumes but when breaking the breaking power may be converted to electrical power.

The switches herein may be any suitable switches known in the art. For example, solid state transistors, such as MOSFET or any other transistor types. The selected switch may depend on the application e.g. being high voltage or low voltage switches. The high voltage switches may be any suitable high voltage switches known in the art. They should be able to handle much higher voltages than the switches in the voltage modules. For example, they could be able to handle voltages from 25 V up to 600 V if each voltage module provides 25 V.

Finally, it should be understood that the invention is not limited to the embodiments described above, but also relates to and incorporates all embodiments within the scope of the appended independent claims.

The invention claimed is:

1. An overlap circuit for a power system, the overlap circuit comprising:

a first controllable switch configured to be directly coupled between a first power source and a load/source, the first controllable switch comprising at least one first variable resistor; and a second controllable switch configured to be directly coupled between a second power source and the load/source, the second controllable switch comprising at least one second variable resistor;

wherein the overlap circuit is configured to switch between a first mode and a second mode;

wherein, in the first mode:

in a switching configuration i) during a first time period T1, the first controllable switch is configured to feed a first current $i_1$ from the first power source to the load/source when the second controllable switch is configured to block a second current $i_2$ from the second power source to the load/source, in a switching configuration ii) during a second time period T2 following the first time period T1, the first controllable switch is configured to feed the first current $i_1$ from the first power source to the load/source while the at least one first variable resistor transitions from fully conductive to fully non-conductive when the second controllable switch is configured to feed the second current $i_2$ from the load to the second power source while the at least one second variable resistor transitions from fully non-conductive to fully conductive, and in a switching configuration iii) during a third time period T3 following the second time period T2, the first controllable switch is configured to block the first current $i_1$ from the first power source to the load/source when the second controllable switch is configured to feed the second current $i_2$ from the second power source to the load/source;

wherein, in the second mode:

in a switching configuration iv) during a fourth time period T4, the first controllable switch is configured to feed a third current is from the load/source to the first power source when the second controllable switch is configured to block a fourth current $i_4$ from the load/source to the second power source;

in a switching configuration v) during a fifth time period T5 following the fourth time period T4, the first controllable switch is configured to feed the third current $i_3$ from the load/source to the first power source while the at least one first variable resistor transitions from fully conductive to fully non-conductive when the second controllable switch is configured to feed the fourth current $i_4$ from the load/source to the second power source while the at least one second variable resistor transitions from fully non-conductive to fully conductive; and in a switching configuration vi) during a sixth time period T6 following the fifth time period T5, the first controllable switch is configured to block the third current is from the load/source to the first power source when the second controllable switch is configured to feed the fourth current $i_4$ from the load/source to the second power source.

2. The overlap circuit of claim 1, further comprising a control device configured to provide first control signals to the first controllable switch and to provide second control signals to the second controllable switch so that the first controllable switch and the second controllable switch both are partially conductive during the second time period T2 such that, in the first mode, the first controllable switch provides the first current $i_1$ while the second controllable switch provides the second current $i_2$ to the load/source.

3. The overlap circuit of claim 2, wherein, in the first mode, the first control signals and the second control signals are non-simultaneously clocked with a time offset dependent on at least one of a current provided to the load/source, a voltage difference between the first power source and the second power source, or a resistance value when a resistance of the first controllable switch equals a resistance of the second controllable switch.

4. The overlap circuit of claim 2, wherein the first control signals and the second control signals are simultaneously or non-simultaneously clocked.

5. The overlap circuit of claim 1, wherein, in the first mode, the overlap circuit is configured to:

switch from the switching configuration i) to the switching configuration ii) when an output voltage of the first power source is smaller than a first threshold voltage $V_{Th1}$; and/or switch from the switching configuration i) to the switching configuration ii) when an output voltage of the second power source is larger than a second threshold voltage $V_{Th2}$.

6. The overlap circuit of claim 5, wherein, in the first mode:

the first threshold voltage $V_{Th1}$ is dependent on a nominal voltage $V_n$ of the load/source, and/or the second threshold voltage $V_{Th2}$ is dependent on at least one of the first threshold voltage $V_{Th1}$ and the nominal voltage $V_n$ of the load/source.

7. The overlap circuit according to claim 1, wherein:

the first controllable switch comprises at least one first diode each coupled in parallel with a respective one of the at least one first variable resistor between the first power source and the load/source; and the second controllable switch comprises at least one second diode each coupled in parallel with a respective one of the at least one second variable resistor between the second power source and the load/source.

* * * * *